United States Patent
Vosshall et al.

(10) Patent No.: US 10,432,551 B1
(45) Date of Patent: Oct. 1, 2019

(54) NETWORK REQUEST THROTTLING

(71) Applicant: Amazon Technologies, Inc., Seattle, WA (US)

(72) Inventors: Peter Sven Vosshall, Bainbridge Island, WA (US); Samuel John Young, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 437 days.

(21) Appl. No.: 14/666,042

(22) Filed: Mar. 23, 2015

(51) Int. Cl.
  *H04L 12/911* (2013.01)

(52) U.S. Cl.
  CPC .................. *H04L 47/783* (2013.01)

(58) Field of Classification Search
  CPC ..................................... H04L 47/783
  USPC .......................................... 709/226
  See application file for complete search history.

(56) References Cited

U.S. PATENT DOCUMENTS

| | | | | |
|---|---|---|---|---|
| 6,185,601 B1 * | 2/2001 | Wolff | ................ | G06F 17/30067 707/E17.005 |
| 6,442,165 B1 * | 8/2002 | Sitaraman | ............... | G06F 9/505 370/395.4 |
| 7,287,082 B1 * | 10/2007 | O'Toole, Jr. | ........ | H04L 67/1008 709/223 |
| 7,321,926 B1 * | 1/2008 | Zhang | ................... | G06F 9/5033 455/453 |
| 7,616,640 B1 * | 11/2009 | Sitaraman | ........... | H04L 12/2872 370/395.1 |
| 8,190,593 B1 * | 5/2012 | Dean | ................. | G06F 17/30864 707/707 |
| 8,521,774 B1 * | 8/2013 | Cai | ................... | G06F 16/24556 707/776 |
| 8,856,376 B1 * | 10/2014 | Watson | ............... | G06F 11/3419 370/230 |
| 8,914,497 B1 | 12/2014 | Xiao et al. | | |
| 8,959,571 B2 * | 2/2015 | Dan | .................... | H04L 41/0893 713/167 |
| 9,077,554 B1 * | 7/2015 | Szabo | ..................... | H04L 12/26 |
| 9,225,479 B1 * | 12/2015 | Rothstein | ............ | H04L 67/1002 |
| 9,231,879 B1 * | 1/2016 | Wojcik | ..................... | H04L 47/32 |
| 9,246,819 B1 * | 1/2016 | Thirasuttakorn | ..... | H04L 47/125 |
| 2002/0095400 A1 * | 7/2002 | Johnson | ................ | H04L 41/147 |
| 2002/0129123 A1 * | 9/2002 | Johnson | ............. | H04L 65/4084 709/219 |

(Continued)

*Primary Examiner* — Philip J Chea
*Assistant Examiner* — Wing Ma
(74) *Attorney, Agent, or Firm* — Robert C. Kowert; Meyertons, Hood, Kivlin, Kowert & Goetzel, P.C.

(57) ABSTRACT

Throttling for network requests may be implemented. A request processing balance may be provided for processing received network requests for a given period of time. As network requests are received, processing costs may be determined for the network requests. Processing costs may be determined on-the-fly based on processing times, resources consumed, or costs incurred to process the network requests at additional systems, in some embodiments. The request processing balance may be updated according to the determined processing costs of received network requests. Network requests may be throttled based on the current request processing balance. In some embodiments, an estimated processing cost may be determined and compared with the current request processing balance to determine whether to throttle the network requests.

21 Claims, 9 Drawing Sheets

(56) References Cited

U.S. PATENT DOCUMENTS

| | | | |
|---|---|---|---|
| 2002/0194251 A1* | 12/2002 | Richter | G06F 9/5011 718/105 |
| 2003/0046396 A1* | 3/2003 | Richter | G06F 9/505 709/226 |
| 2004/0088413 A1* | 5/2004 | Bhogi | G06F 9/5061 709/226 |
| 2010/0131668 A1* | 5/2010 | Kamath | H04L 47/32 709/233 |
| 2010/0229218 A1* | 9/2010 | Kumbalimutt | G06F 9/5005 726/4 |
| 2011/0153724 A1* | 6/2011 | Raja | H04L 67/325 709/203 |
| 2011/0153839 A1* | 6/2011 | Rajan | H04L 47/32 709/227 |
| 2011/0208875 A1* | 8/2011 | Hasson | G06F 1/3203 709/238 |
| 2011/0252127 A1* | 10/2011 | Iyengar | G06F 9/5033 709/224 |
| 2012/0060062 A1* | 3/2012 | Lin | H04L 67/1002 714/48 |
| 2013/0294350 A1* | 11/2013 | Nurminen | H04L 41/0663 370/328 |
| 2014/0059682 A1* | 2/2014 | Bhate | H04L 63/1458 726/22 |
| 2014/0074641 A1* | 3/2014 | Wang | G06F 9/50 705/26.3 |
| 2014/0180862 A1* | 6/2014 | Certain | G06Q 30/08 705/26.3 |
| 2014/0337472 A1* | 11/2014 | Newton | H04L 67/32 709/217 |
| 2014/0365554 A1* | 12/2014 | Bleau | H04L 67/42 709/203 |
| 2015/0100630 A1* | 4/2015 | Xiao | H04L 67/16 709/203 |
| 2015/0100698 A1* | 4/2015 | Valbuena | H04L 41/5051 709/226 |
| 2015/0106422 A1* | 4/2015 | Svoboda | H04L 67/32 709/202 |
| 2015/0156123 A1* | 6/2015 | Xiao | H04L 47/12 370/230 |
| 2015/0263978 A1* | 9/2015 | Olson | G06F 9/505 709/226 |
| 2016/0080484 A1* | 3/2016 | Earl | H04L 67/1031 709/226 |
| 2016/0103559 A1* | 4/2016 | Maheshwari | G06F 16/248 715/738 |
| 2016/0182328 A1* | 6/2016 | Bhasin | H04L 43/067 709/224 |
| 2016/0197833 A1* | 7/2016 | Sterling | G06Q 10/06 709/224 |
| 2016/0373373 A1* | 12/2016 | Das | H04L 67/00 |
| 2018/0027006 A1* | 1/2018 | Zimmermann | H04L 63/0245 726/11 |

* cited by examiner

NETWORK REQUEST THROTTLING

BACKGROUND

Network-based systems may be leveraged to create many different types of services or perform different functions for client systems or devices. For example, virtual machines may be used to implement a network-based service for external customers, such as an e-commerce platform. Network-based systems may also be used to implement a service or tool for internal customers, such as information technology (IT) service implemented as part of an internal network for a corporation. Network traffic may therefore be directed to these network-based systems in order to perform the various functions or tasks provided by the systems, services or functions offered by the network-based systems. In order to ensure that network-based systems are not overwhelmed by network traffic, throttling may be enforced against network traffic received at network-based systems. However as the types of network requests, and operations performed in response may vary, some throttling controls may need to account for the varying types of demands placed on a network-based by network requests.

Figure 1:
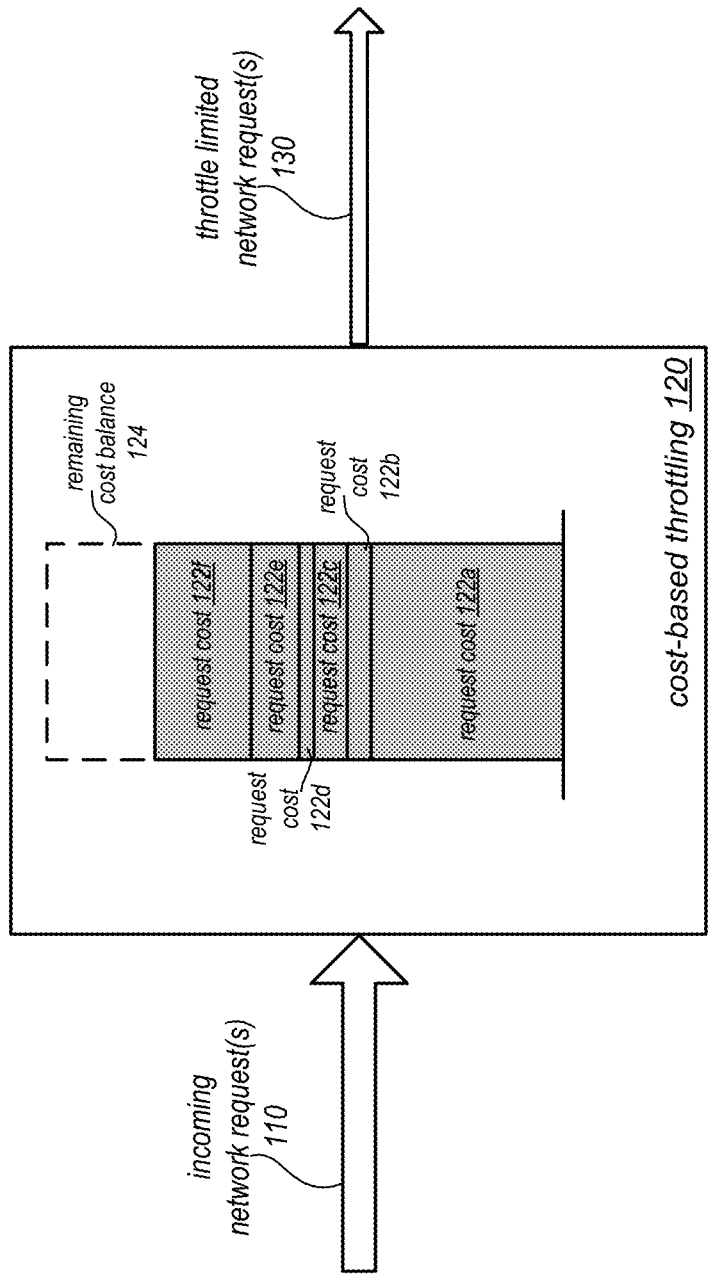
FIG. 1 is a logical block diagram illustrating processing cost throttling for network requests, according to some embodiments.

While embodiments are described herein by way of example for several embodiments and illustrative drawings, those skilled in the art will recognize that the embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). The words "include," "including," and "includes" indicate open-ended relationships and therefore mean including, but not limited to. Similarly, the words "have," "having," and "has" also indicate open-ended relationships, and thus mean having, but not limited to. The terms "first," "second," "third," and so forth as used herein are used as labels for nouns that they precede, and do not imply any type of ordering (e.g., spatial, temporal, logical, etc.) unless such an ordering is otherwise explicitly indicated.

Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a computer system may be configured to perform operations even when the operations are not currently being performed). In some contexts, "configured to" may be a broad recitation of structure generally meaning "having circuitry that" performs the task or tasks during operation. As such, the component can be configured to perform the task even when the component is not currently on. The circuitry that forms the structure corresponding to "configured to" may include hardware circuits. In some contexts, the structure may be implemented as part of a general purpose computing device that is programmed to perform the task or tasks according to programming instructions.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112(f), interpretation for that component.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While B may be a factor that affects the determination of A, such a phrase does not foreclose the determination of A from also being based on C. In other instances, A may be determined based solely on B.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

DETAILED DESCRIPTION

Various embodiments of throttling for network requests are described. Network-based systems provide many different services, functions, or applications to different clients via network communication. Network requests sent from these clients to network-based systems may invoke the performance of the different services functions, or applications on behalf of the client. When network-based systems are made widely available to receive network requests from many different sources, there may be limitations as to the number of network requests that the network system can process at any one time. Moreover, as the sophistication and frequency with which malicious network request-based attacks can be launched against a network-based system, controls to moderate traffic are increasingly important.

Throttling techniques are one way in which network traffic directed toward a network-based system can be controlled. Typically, network requests are rate limited, so that if the number of requests for a network-based system from a traffic source, such as particular network address or logical association, is received that exceeds a threshold, subsequent network traffic is throttled, often denying the subsequent network requests. Not all network requests, however, are created equal. If network requests that invoke high processing burdens on a network-based system are received, a smaller number of such requests, even under a throttling limitation, can overwhelm the network-based system. Processing cost throttling for network requests accounts for the differences between network requests, fine-tuning throttling to account for changes in request triggered behavior.

FIG. 1 is a logical block diagram illustrating processing cost throttling for network requests, according to some embodiments. Cost-based throttling 120 provides a throttling mechanism for incoming network requests 110. For those network requests that are determined to exceed a cost-based throttling limitation, denials, error responses, or other throttling actions may be taken, allowing throttle-limited network requests 130 to proceed for processing at a network-based system. A processing cost balance may be provided for a given period of time. For example, 10 processing seconds may be provided for every 1 second. As network requests are received and processed, the cost of the different network requests may be determined. For instance, as illustrated in FIG. 1, different requests may have different costs. Request cost 122a is larger than request cost 122b, 122c, 122d, 122e, or 122f.

Request cost may be determined dynamically, on-the-fly so that a current understanding of the cost to process any received request at a network-based system may be understood. In this way, the actual effect of network requests may be accounted for. Resource utilization of different components or devices of a network-based system may be captured to determine the processing costs of a network request (e.g., CPU time, disk utilization, network bandwidth, etc.). In at least some embodiments, a predetermined cost for network requests may be identified. For instance, costs may be determined from a rolling average of previously determined processing costs. Pre-determined costs may be determined from assigned costs for different types of network requests, in some embodiments. As processing costs for requests in a given time period are determined, a request processing balance may be updated. Throttling decisions may be made with respect to the remaining cost balance 124. For example, in some embodiments, any request may be processed as long as some cost balance remains. While in other embodiments, the cost of a network request that is received may be estimated and if exceeding the remaining cost balance 124, the network request may be throttled. The cost balance for request processing may be replenished over time (e.g., at the beginning of every period of time). In this way cost-based processing may be implemented to provide throttling as part of various request handling schemes. A leaky bucket technique for instance may be implemented where the cost-balance indicates which of those network requests overflow the bucket (and are thus throttled).

Please note that the previous example provides a logical illustration of cost-based throttling for network requests and is not intended to be limiting as to the number, type, or costs of network requests, nor the various systems, components, or devices which may implement cost-based throttling for network requests.

The specification first describes an example of a provider network that offers one or more network-based services, such as a virtual computing service, storage service, or item fulfillment service, for different provider network clients. Included in the description of the example network-based system are various examples of systems or devices which may implement cost-based throttling for network requests. The specification then describes a flowchart of various embodiments of methods for implementing cost-based throttling for network requests. Next, the specification describes an example system that may implement the disclosed techniques. Various examples are provided throughout the specification.

Figure 2:
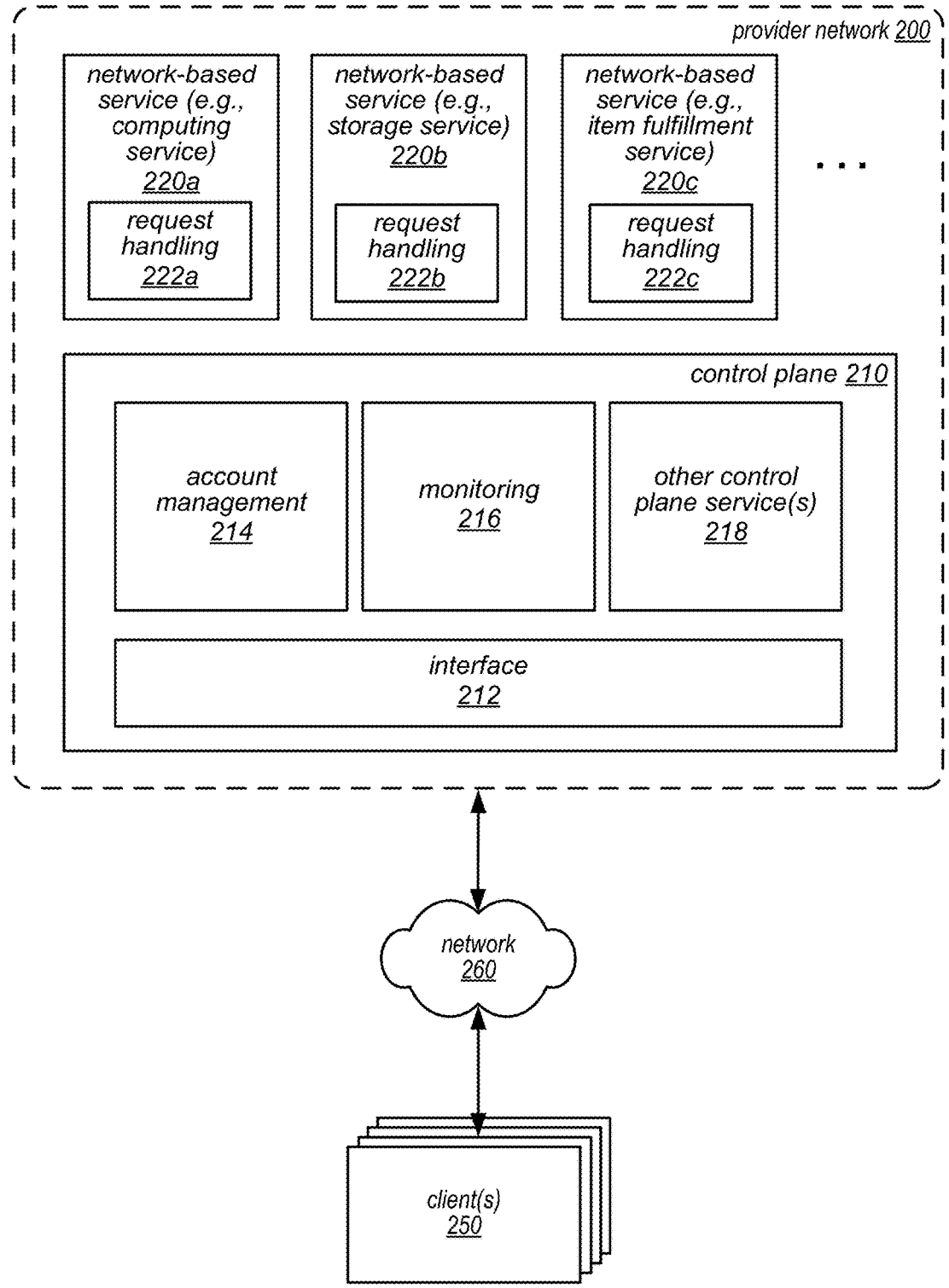
FIG. 2 is a block diagram illustrating a provider network of different network-based services which may implement processing cost throttling for network requests, according to some embodiments.

FIG. 2 is a block diagram illustrating a provider network of different network-based services which may implement cost-based throttling for network requests, according to some embodiments. Provider network 200 may be set up by an entity such as a company or a public sector organization to provide one or more services (such as various types of cloud-based computing, storage, or item fulfillment) accessible via the Internet and/or other networks to clients 210. Provider network 200 may include numerous data centers hosting various resource pools, such as collections of physical and/or virtualized computer servers, storage devices, networking equipment and the like (e.g., computing system 1000 described below with regard to FIG. 9), needed to implement and distribute the infrastructure and services 220 offered by the provider network 200. Network-based services 220 may implement respective request handling 222 for network requests directed to the services 220.

For example, network-based service 220a may be a virtual computing service. A virtual computing service may offer various compute instances to clients 250. A virtual compute instance may, for example, comprise one or more servers with a specified computational capacity (which may be specified by indicating the type and number of CPUs, the main memory size, and so on) and a specified software stack (e.g., a particular version of an operating system, which may in turn run on top of a hypervisor). A number of different types of computing devices may be used singly or in combination to implement the compute instances of a virtual compute service in different embodiments, including special purpose computer servers, storage devices, network devices and the like. In some embodiments instance clients or other any other user may be configured (and/or authorized) to direct network traffic to a compute instance.

A further example of a network-based service, such as network-based service 220b, may be a storage service. A storage service may maintain data on behalf of clients 250 (or other services 220) that is accessible via various network requests. Database services, archive services, block-based storage services, key-value stores, or any other form of storage service may be implanted. Another example of a network-based service, such as network-based service 220c, may be an item fulfillment service. An item fulfillment service offers items to customers or clients (which may be users) via network-based site (e.g., a web site). Items may be physical items (e.g., books, clothes, electronics, perishable goods, etc.) virtual or digital consumable items (e.g., media content, such as audio, video, games, or other interactive content), or services (e.g., transportation, entertainment, repair, installation, construction, etc.) which may be offered and/or provided to users via provider network 200. The items may be used, purchased, rented, or otherwise consumed via various network requests to the item fulfillment service.

In various embodiments, the components illustrated in FIG. 2 may be implemented directly within computer hardware, as instructions directly or indirectly executable by computer hardware (e.g., a microprocessor or computer system), or using a combination of these techniques. For example, the components of FIG. 2 may be implemented by a system that includes a number of computing nodes (or simply, nodes), each of which may be similar to the computer system embodiment illustrated in FIG. 9 and described below. In various embodiments, the functionality of a given system component (e.g., a component of the distributed system) may be implemented by a particular node or may be distributed across several nodes. In some embodiments, a given node may implement the functionality of more than one system component (e.g., more than one storage system component).

Provider network 200 may implement control plane 200 to provide various account management 214 features for different user accounts of provider network, including billing and reporting. Monitoring 216 may be implemented to collect various data such as may be used to provide an indication of request processing costs to a client via an interface, such as interface 212 and described below with regard to FIG. 5. Monitoring 216 may maintain a database of usage data that may be queried and processed by external systems for reporting and billing of client usage activity. In certain embodiments, monitoring 216 may be configured to collect, monitor and/or aggregate a variety of storage service system operational metrics, such as metrics reflecting the rates and types of requests received from clients 250, bandwidth utilized by such requests, system processing latency for such requests, system component utilization (e.g., network bandwidth and/or storage utilization within the storage service system), rates and types of errors resulting from requests, or any other suitable metrics. In some embodiments such metrics may be used by system administrators to tune and maintain system components, while in other embodiments such metrics (or relevant portions of such metrics) may be exposed to clients 250 to enable such clients to monitor their usage of network-based services 220.

In some embodiments, other control plane services 218 may include user authentication and access control procedures. For example, for a given network request to access a service 220, access controls may be configured to ascertain whether the client 250 associated with the request is authorized to access the service. Authorization may be determined, for example, by evaluating an identity, password or other credential against credentials associated with the particular database table, or evaluating the requested access to the particular database table against an access control list for the particular database table. For example, if a client 250 does not have sufficient credentials to access the service, access controls may reject the corresponding network request, for example by returning a response to the requesting client 250 indicating an error condition. Various access control policies may be stored as records or lists of access control information by network-based services 220.

Clients 250 may encompass any type of client configurable to access services 220. Clients 250 may be individual components, applications, or devices, or alternatively may be other systems, such as a database system that utilizes a service 220 to store data for databases managed at the distributed database system. Clients 250 may be operated by a user or other agent to view items offered by an item fulfillment service. Clients 250 may submit network requests according to an interface 212, such as an application programming interface (API). For example, a given client 250 may format update requests to write data to particular portions of data according to a command line interface utilizing the API. Similarly, read requests may also be formatted according to the API. Responses and acknowledgments from services 220 may also be formatted according to the API.

Clients 250 may convey access requests to and receive responses/acknowledgments from provider network 200 via network 260. In various embodiments, network 260 may encompass any suitable combination of networking hardware and protocols necessary to establish network-based-based communications between clients 250 and provider network 200. For example, network 260 may generally encompass the various telecommunications networks and service providers that collectively implement the Internet. Network 260 may also include private networks such as local area networks (LANs) or wide area networks (WANs) as well as public or private wireless networks. For example, both a given client 250 and provider network 200 may be respectively provisioned within enterprises having their own internal networks. In such an embodiment, network 260 may include the hardware (e.g., modems, routers, switches, load balancers, proxy servers, etc.) and software (e.g., protocol stacks, accounting software, firewall/security software, etc.) necessary to establish a networking link between given client 250 and the Internet as well as between the Internet and provider network 200. It is noted that in some embodiments, clients 250 may communicate with provider network 200 using a private network rather than the public Internet. For example, clients 250 may be provisioned within the same enterprise as a distributed system (e.g., a system that implements both clients 250 and provider network 200). In such a case, clients 250 may communicate with distributed system 200 entirely through a private network 260 (e.g., a LAN or WAN that may use Internet-based communication protocols but which is not publicly accessible).

Figure 3:
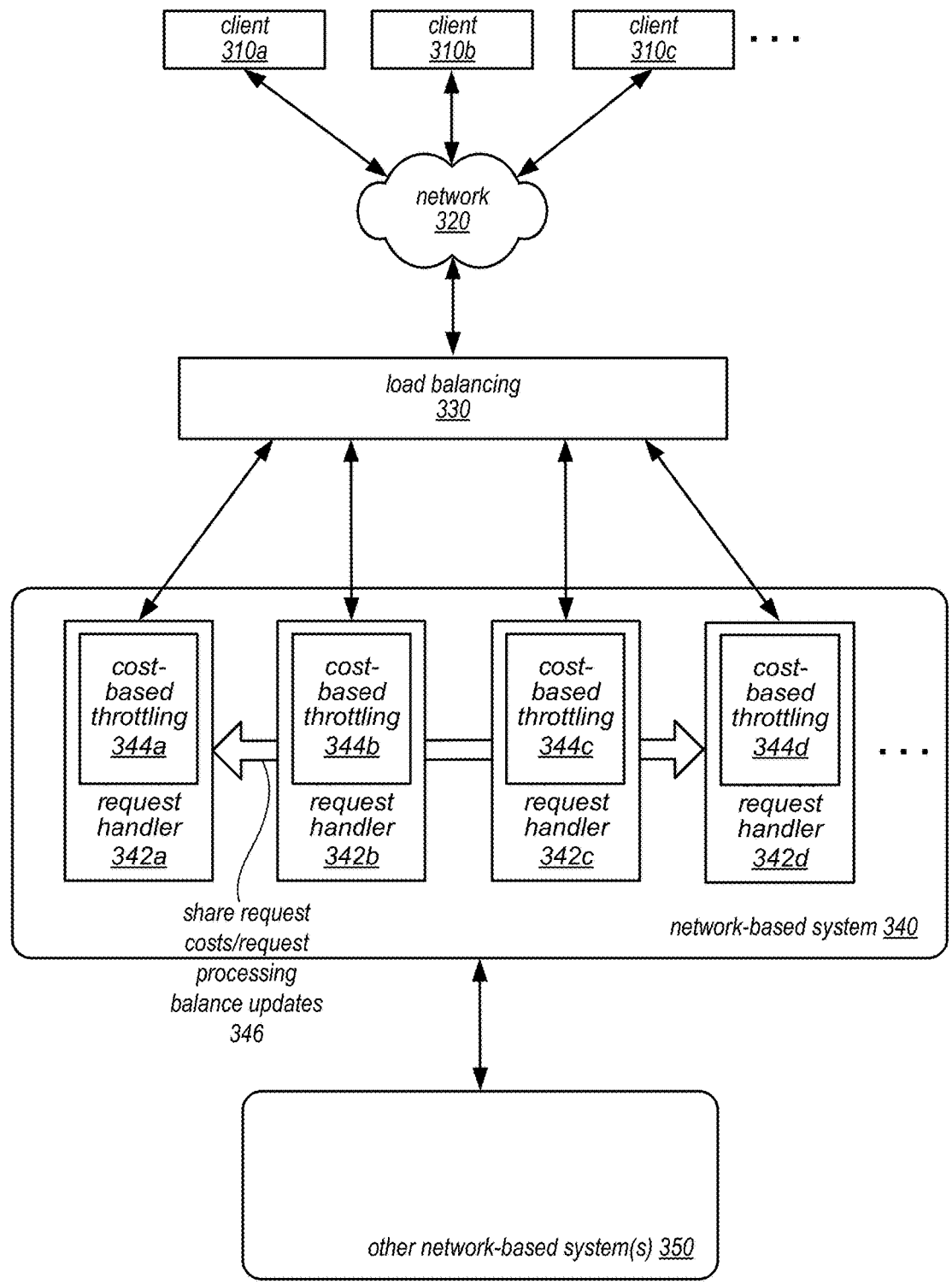
FIG. 3 is a block diagram illustrating request handlers that implement processing cost throttling for a network-based system, according to some embodiments.

Various different types of network-based systems, such as network-based services 220, are discussed above with regard to FIG. 2. These services and other network-based systems may implement cost-based request throttling as part of request handling local to a network-based system. FIG. 3 is a block diagram illustrating request handlers that implement cost-based throttling for a network-based system, according to some embodiments.

Clients 310 may be similar to clients 250 in FIG. 2 above, and may direct various network-based requests to network-based system 340 via network 320. In at least some embodiments, load balancing 330 may be implemented to evenly distribute network requests to request handlers 342 of network-based system 340. Network-based system 340 may implement request handlers 342 to interact with clients 310, handling received network requests. For example, request handlers 342 may initiate various workflows, processes, accesses, or other steps to service a received network request. In at least some embodiments, other network-based system(s) 350 may be invoked to perform certain actions in order to service the network requests.

As illustrated in FIG. 3, request handlers 342 may respectively implement cost-based throttling 344, in some embodiments. As requests are received within a given time period an evaluation may be made as to whether a current request processing balance will allow for a received network request to be processed. The various techniques described below with regard to FIGS. 6-8 may be performed by request handler to throttle or deny network requests, or process network requests, determine processing costs for network requests and update request processing balances for a source. Request handlers may have access to local performance statistics for network-based system 340 in order to determine processing costs on-the-fly. In some embodiments, other network-based system(s) 350 may report, or provide resource utilization information to request handlers 342 for determining processing costs. Request handlers 342 may maintain different request processing balances for different sources, in some embodiments. As illustrated in FIG. 3, request handling for network-based system 340 may be implemented across multiple request handlers, 342a, 342b, 342c, and 342d. As network requests from a source may be distributed to different ones of these request handlers 342, request handlers 342 may share request costs/request processing balance updates 346 for sources in order to provide a consistent cost-based throttling with respect to a source. For example, request handlers 342 may implement one of various kinds of multi-cast, gossip, or other group communication technique to share request costs/request processing balance updates 346 so that requests received from a source may be throttled according to the cost-balance independent of the particular request handler 342 that receives a request from the source.

Figure 4:
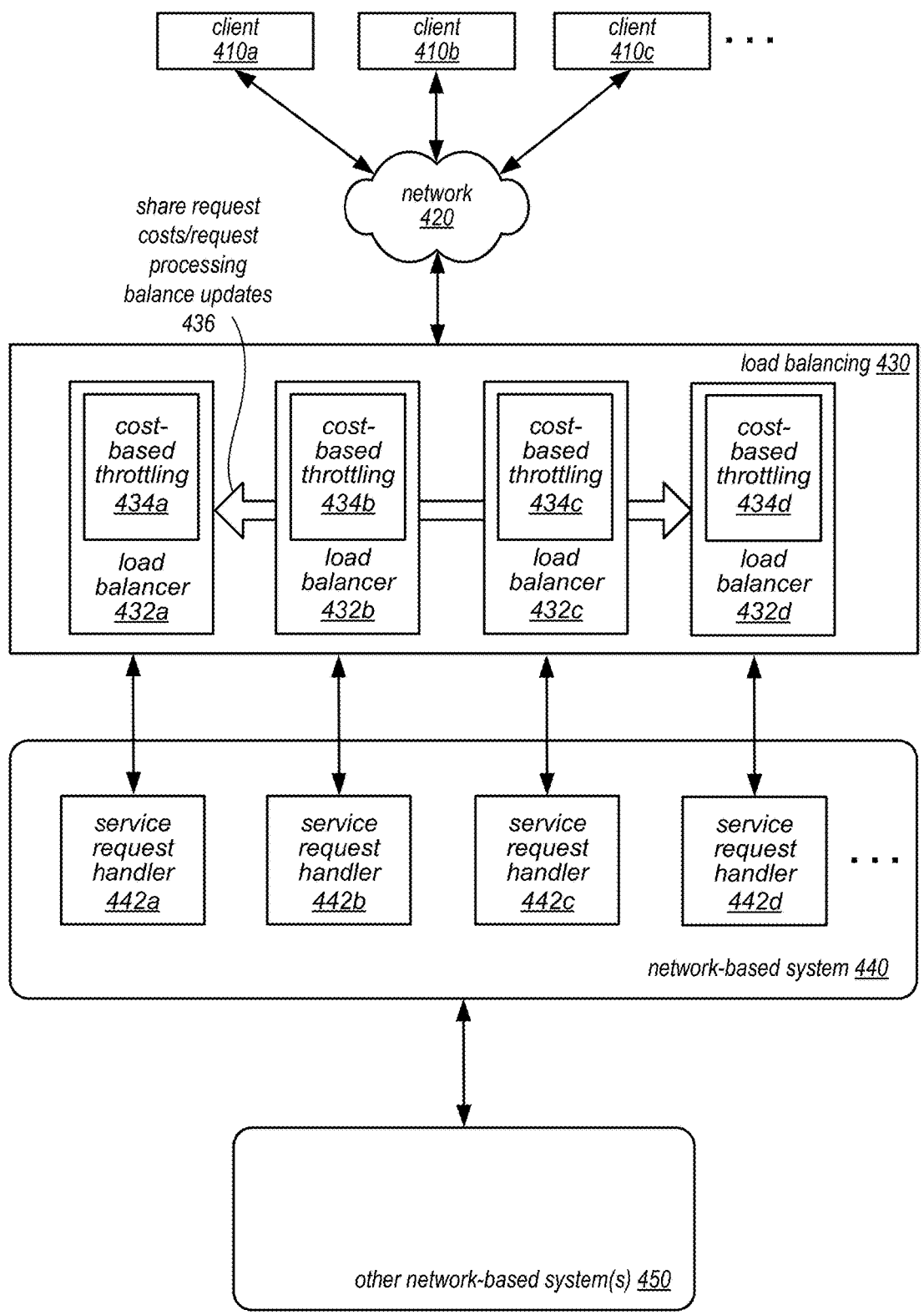
FIG. 4 is a block diagram illustrating load balancers that implement processing cost throttling for a network-based system, according to some embodiments.

In some embodiments, cost-based throttling may be implemented in systems that are physically or logically external to a network-based system. FIG. 4 is a block diagram illustrating load balancers that implement cost-based throttling for a network-based system, according to some embodiments. As with FIG. 3 above, clients 410 may be similar to clients 250 in FIG. 2 above, and may direct various network-based requests to network-based system 440 via network 420. In at least some embodiments, load balancing 430 may be implemented to evenly distribute network requests to request handlers 442 of network-based system 440. Network-based system 440 may implement request handlers 442 to interact with clients 410, handling received network requests. For example, request handlers 442 may initiate various workflows, processes, accesses, or other steps to service a received network request. In at least some embodiments, other network-based system(s) 450 may be invoked to perform certain actions in order to service the network requests.

As illustrated in FIG. 3, load balancers 432 may respectively implement cost-based throttling 434, in some embodiments. As requests are received within a given time period an evaluation may be made as to whether a current request processing balance will allow for a received network request to be processed. The various techniques described above with regard to FIG. 3 and below with regard to FIGS. 6-8 may be performed by load balancers 432 to throttle or deny network requests, or direct network requests to request handlers for processing, determine processing costs for network requests and update request processing balances for a source. In some embodiments, network-based system 440 (e.g., request handlers 442) and other network-based system(s) 450 may report, or provide resource utilization information to load balancers 432 for determining processing costs. For example, processing times, utilization percentages, and other information may be included in various message headers or data fields along with network request responses sent to load balancers 432. Load balancers 432 may maintain different request processing balances for different sources, in some embodiments. As illustrated in FIG. 4, load balancing 430 for network-based system 440 may be implemented across multiple load balancers, 432a, 432b, 432c, and 432d. As network requests from a source may be received at different ones of these load balancers, load balancers 432 may share request costs/request processing balance updates 436 for sources in order to provide consistent cost-based throttling. For example, load balancers 432 may implement one of various kinds of multi-cast, gossip, or other group communication technique or protocol to share request costs/request processing balance updates 436 346 so that requests received from a source may be throttled according to the cost-balance independent of the particular request handler 342 that receives a request from the source.

Figure 5:
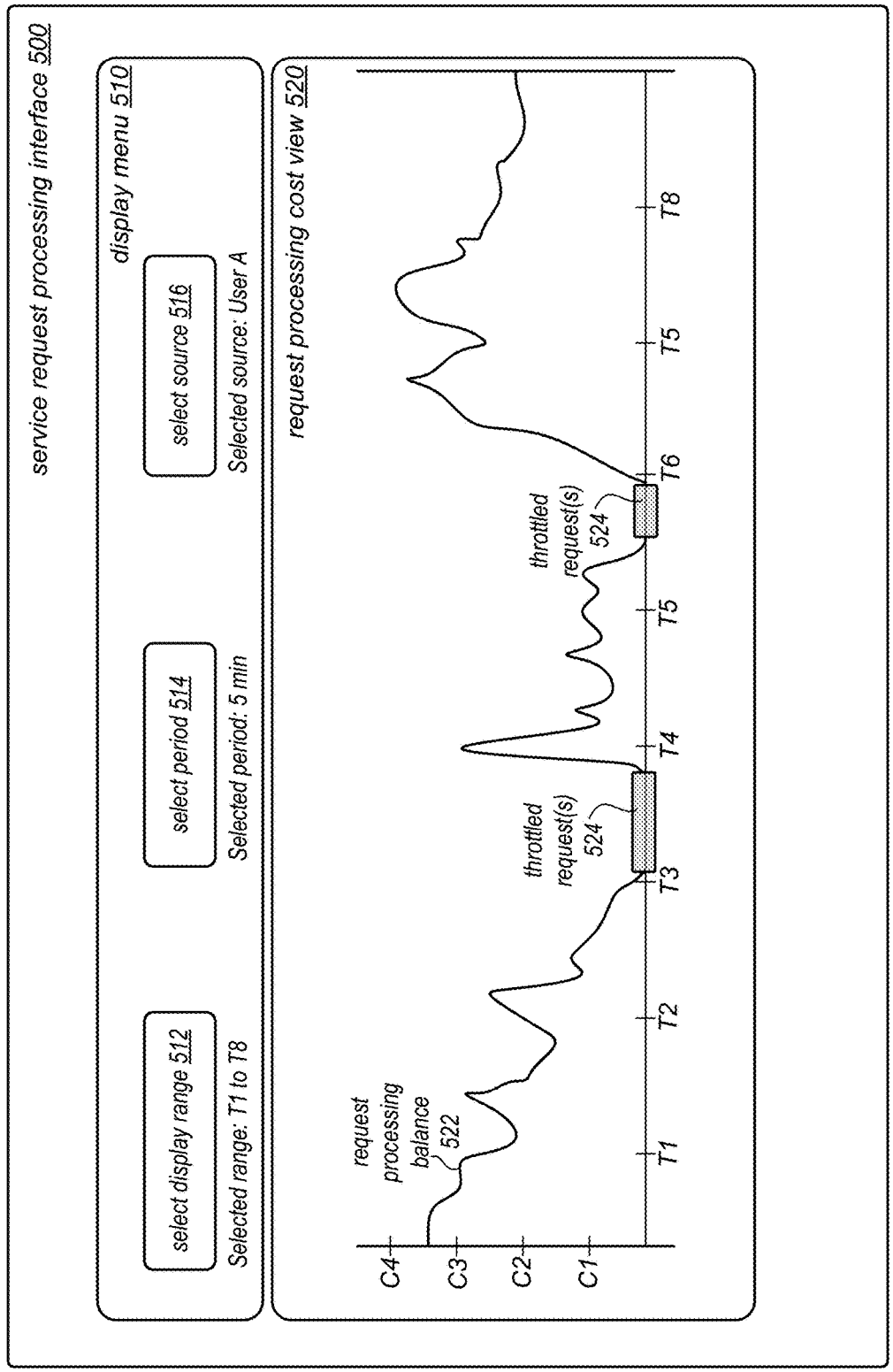
FIG. 5 is an example of a service request processing interface which indicates request processing costs, according to some embodiments.

FIG. 5 is an example of a service request processing interface which indicates request processing costs, according to some embodiments. Service request processing interface 500 may be implemented as part of interface 212 in FIG. 2 for a provider network 200, or as part of an interface specific to a network-based service 220 or network-based system 340 and 440 in FIGS. 3 and 4 respectively. Service request processing interface 500 is illustrated as a graphical user interface in FIG. 5. However, in other embodiments, similar information could be textually requested and/or provided a command line or other type of interface.

Request processing cost view 520 may provide a view of a range of time T1-T8 over which the balance for request processing (e.g., C1-C4) may be tracked. A request processing budget or balance may be determined for the total processing costs allocated for processing requests received from a source. For example, data points may indicate particular times T where network-based requests exceeded the available cost balance for processing requests and are throttled, as indicated at the highlighted portions 524. In this way, a user can review network request processing behavior at a particular point in time, and use the displayed information to optimize or improve network request processing with respect to the balance 522. In some embodiments, a greater budget or refill rate for the cost balance may be available for purchase which may increase the number of requests that can be processed from a source.

Display menu 510 may be implemented as part of service request processing interface 500 to provide various controls to select request processing cost data provided. For example, element 512 may allow a display range of time to be selected for view 520 (e.g., T1-T8). Element 514 may, in some embodiments, be implemented to provide a selection of a particular time period for each data point (e.g., a 5 minute average of request processing balance is displayed at each data point). In some embodiments, the source from which the network requests are received can be selected at element 516. For example, different users, such as User A can be selected, or client devices, network addresses, or other identifiable groups or sources of network requests may be selected for view. In this way the request processing performance for an individual source may be displayed a varying granularities at which cost-based throttling is performed (e.g., per network address or group of network addresses), For instance, cost-based throttling may be separately performed for different network addresses associated with the same user account (and thus the individual performance of each network address may be displayed). Please note that FIG. 5 is an example of a service request processing interface, and is not intended to be limiting.

Figure 6:
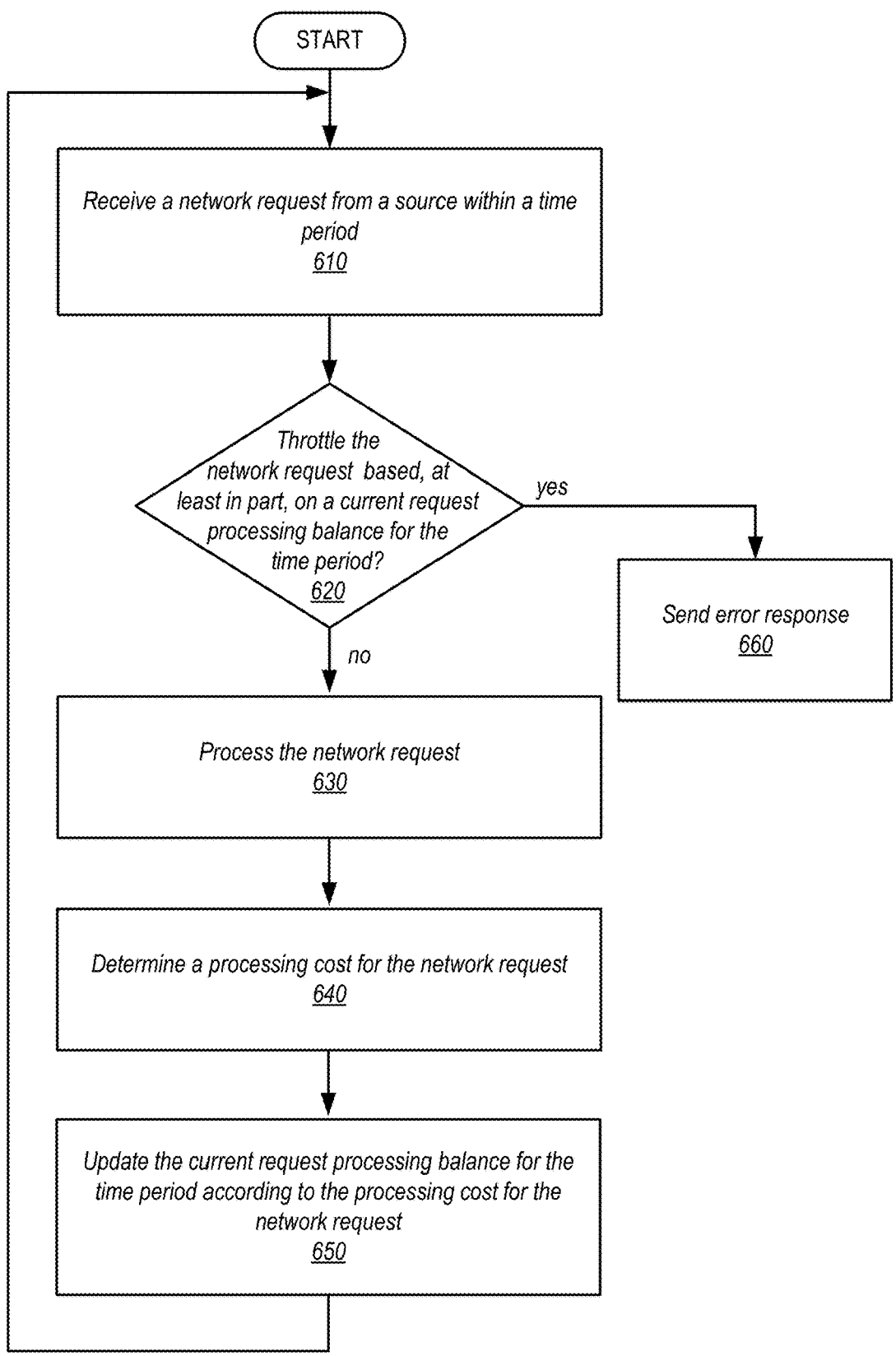
FIG. 6 is a high-level flowchart illustrating methods and techniques for processing cost throttling of network requests, according to some embodiments.

The techniques described above with regard to FIGS. 2-5 may be implemented for many different network-based systems which implement request throttling. For example, content providers, e-commerce platforms, or other web sites may implement cost-based request throttling. Less public-facing systems, such as various communication systems or infrastructures, financial systems, distribution systems, or any other network-based system may implement cost-based throttling for network requests. Therefore, network-based systems that implement cost-based throttling for network requests are not limited to the examples given above. Moreover, although these examples are given with regard to a provider network (e.g., provider network 200 in FIG. 2), the previously described techniques are not limited to such systems. FIG. 6 is a high-level flowchart illustrating methods and techniques to implement dynamic data partitioning for stateless request routing, according to some embodiments.

As indicated at 610, a network request from a source may be received within a time period for a network-based system. A network request may be any form or structure of a request (e.g., formatted according to various communication protocols, such as Hypertext Transfer Protocol (HTTP), and/or programmatic interfaces, such as an Application Programming Interface (API)) received via a network from another client, system, or device. The request may be received at a request handler or other component (such as a load balancer) which may perform cost-based throttling. The request may trigger, invoke, indicate, or otherwise communicate one or more tasks to be performed at the network-based system.

A time period may be the period of time in which network requests are received (and/or processed) to which is allocated a certain processing cost for performing network requests from the source. For example, a time period of 1 second may be allocated 10 processing seconds (e.g., of CPU time and/or another resource). At the beginning of a new time period, the allocated cost (or request processing balance) is reset to the same (or different) allocated cost. For instance, every 1 second, 10 processing seconds may be allocated, continuing with the example above. Resetting the allocated cost may not include any remaining balance from a previous time period that was not used, in some embodiments. Nor does any negative balance carry over, in some embodiments. In this way, a leaky bucket technique (or other throttling technique) may utilize cost-based throttling to determine when no more requests may be serviced.

A source may be associated with clients, user accounts, network addresses, or other identifiable grouping for which it is desirable to throttle (e.g., an autonomous system number (ASN) or tag or identifier in a request, such as a user account for a service that is making the request on the user account's behalf). For instance, a user account of a network-based system may be associated with multiple different clients or network addresses, which may be sending network requests to the network-based system on behalf of the user account. Cost-based throttling may be scoped or tuned to a single client or network address in some embodiments, while in other embodiments, a combination of clients, network addresses, and other source identifying information may be used to throttle against the source. For instance, some malicious request-based attacks may be utilized many different clients and/or network addresses. However, a common source of the requests used in the attack may be determined and throttled against.

As indicated at 620, the network request may be throttled based, at least in part, on a current request processing balance for the time period. For example, the current request processing balance may be identified according to a number of cost units, in some embodiments. Cost units may be time (e.g., seconds, milliseconds, etc.) or other indication of utilization, weight, or request processing priority. In at least some embodiments, a request processing balance may be initially set to account for request buffering (and other techniques which may allow for burst processing), such as provided in a leaky bucket throttling technique. If the request processing balance is zero, empty, or otherwise used for previously received network requests, then the network request may be throttled, as indicated by the positive exit from 620. In some embodiments predictive throttling may be implemented, as discussed below with regard to FIG. 7, in order to provide a fine-grained approach to throttling costly network requests while allowing less costly network requests. As indicated at 660, an error response may be sent in some embodiments. For example, a busy error, such as HTTP error 503 may be sent. Other throttling techniques, however, may be implemented, such as buffering the received request until a new time period begins. Thus, in some embodiments, throttled requests may yet be processed, just not within the current time period.

For those network requests that are not subject to throttling, the network request may be performed, as indicated at 630, in various embodiments. For instance, invoked tasks, workflows, process, accesses, or any other action taken as a result of a network request may be initiated. In some embodiments, network requests may trigger the performance of work at other systems than the network-based system that initially received the network request, as discussed below with regard to FIG. 8.

As indicated at 640, a processing cost for the network request may be determined, in various embodiments. A processing cost may be determined on-the-fly or dynamically for network requests, in some embodiments. For instance, resource utilization metrics, request processing time, and/or other information describing the processing of the network request may be used to determine a cost. Total elapsed time to process the network request may be used, for example. In some embodiments, the cost may be determined by combining various different performance metrics into a single score or cost for the processing of the network request. Consider the example, where multiple utilization metrics are collected for the processing of the network requests. These individual utilization metrics could be combined into a total utilization metric for processing the request (e.g., % of resources). In some embodiments, processing cost may be determined according to predefined values or historical data. For example, data that maps cost values for different types of requests may be maintained. In another example, a moving average of processing cost for each type of request may be calculated and updated after a network request is processed. In this way, as the cost of network requests changes over time, the predetermined cost of the request may change correspondingly.

As indicated at 650, the current request processing balance for the time period may be updated according to the request processing cost for the network request. For example, the determined cost may be subtracted from the balance.

Figure 7:
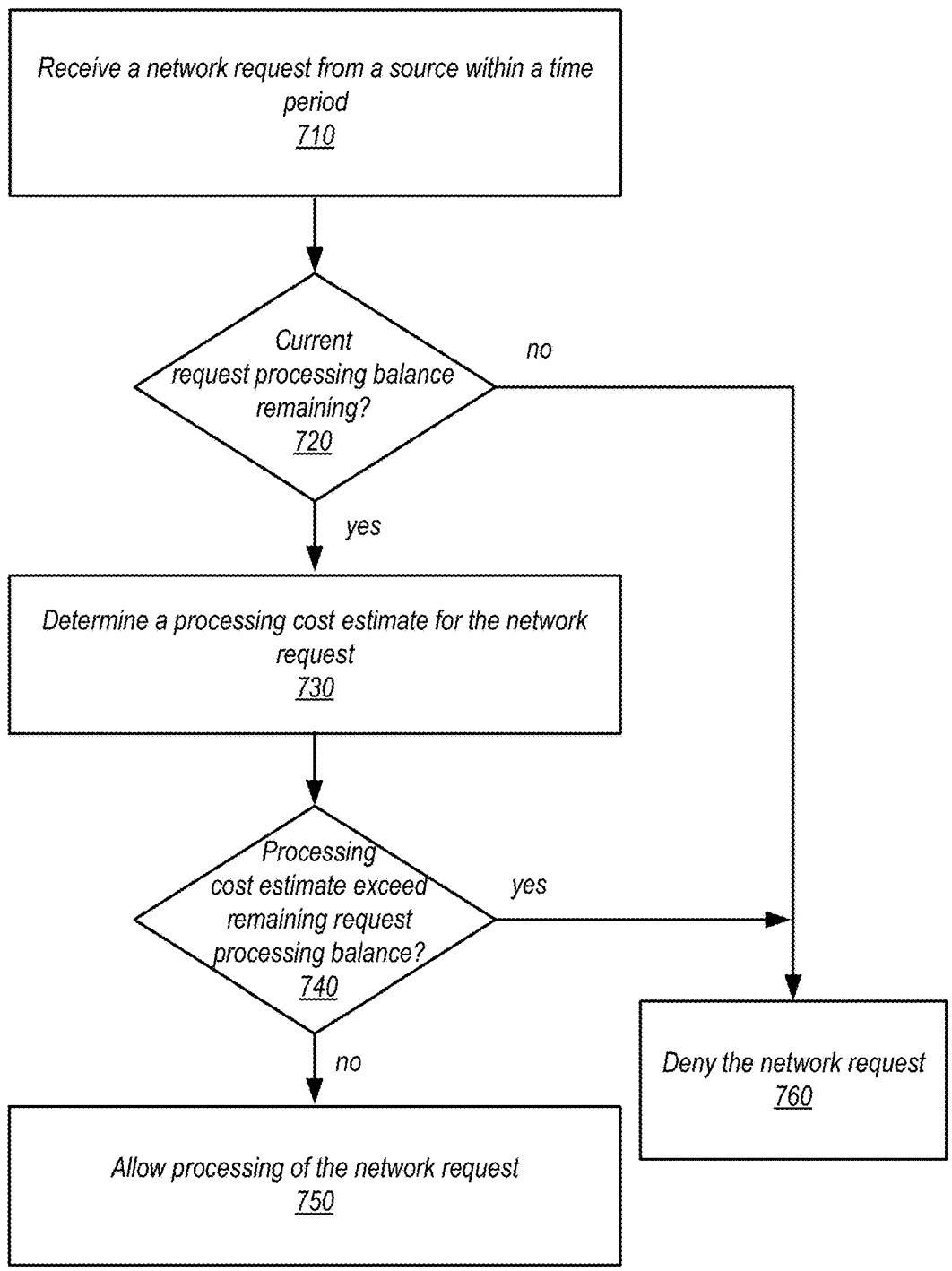
FIG. 7 is a high-level flowchart illustrating methods and techniques for throttling a network request according to a request processing balance, according to some embodiments.

Throttling decisions may be performed with respect to a request processing balance in many ways. For example, cost-based throttling may be performed to determine an estimated cost of processing network requests prior to processing network requests in order to predictively throttle requests that might result in a request processing balance being exceeded. FIG. 7 is a high-level flowchart illustrating methods and techniques for throttling a network request according to a request processing balance, according to some embodiments.

As indicated at 710, a network request may be received from a source within a time period. Prior to processing the request, a determination may be made as to whether any current request processing balance remains for the time period, as indicated at 720. For example, if the current request processing balance is zero, or negative, already processed requests may have used up the allocated processing costs for the time period. As indicated by the negative exit from 720, if no request processing balance remains, then the network request may be denied 760 (e.g., sending an HTTP 503 error response). However, if some request processing balance currently remains, then the network request may yet be processed.

As indicated at 730, in some embodiments, a processing cost estimate may be determined for the network request. For example, a predetermined mapping of cost values to different request types may be maintained. The request type of the network request may be identified (e.g., a particular API call, HTTP command, etc.) and the mapped predetermined cost used as the estimated processing cost. In some embodiments, historical data for previously processed network requests may be maintained, for instance, according to request type. As in the previous example the request type for the network request may be identified, and the historical data associated with the request type may be accessed. For instance, a moving average may be calculated for the request type, with the current average value selected as the estimated processing cost for the network request.

As by the positive exit from 740, if the cost estimate for the network request exceeds the remaining request processing balance, then the network request may be denied, as indicated at 760. For example, if the estimated cost is valued at 63 units/time and the request processing balance is 42 units/time, the network request may be denied. However, if the cost estimate does not exceed the request processing balance (e.g., 27 units/time), then processing of the request may be allowed, as indicated at 750. Predictive cost-based throttling may allow for fine-grained throttling of large requests that would exceed allocated request processing for a source, while allowing one or many smaller network requests to proceed.

Figure 8:
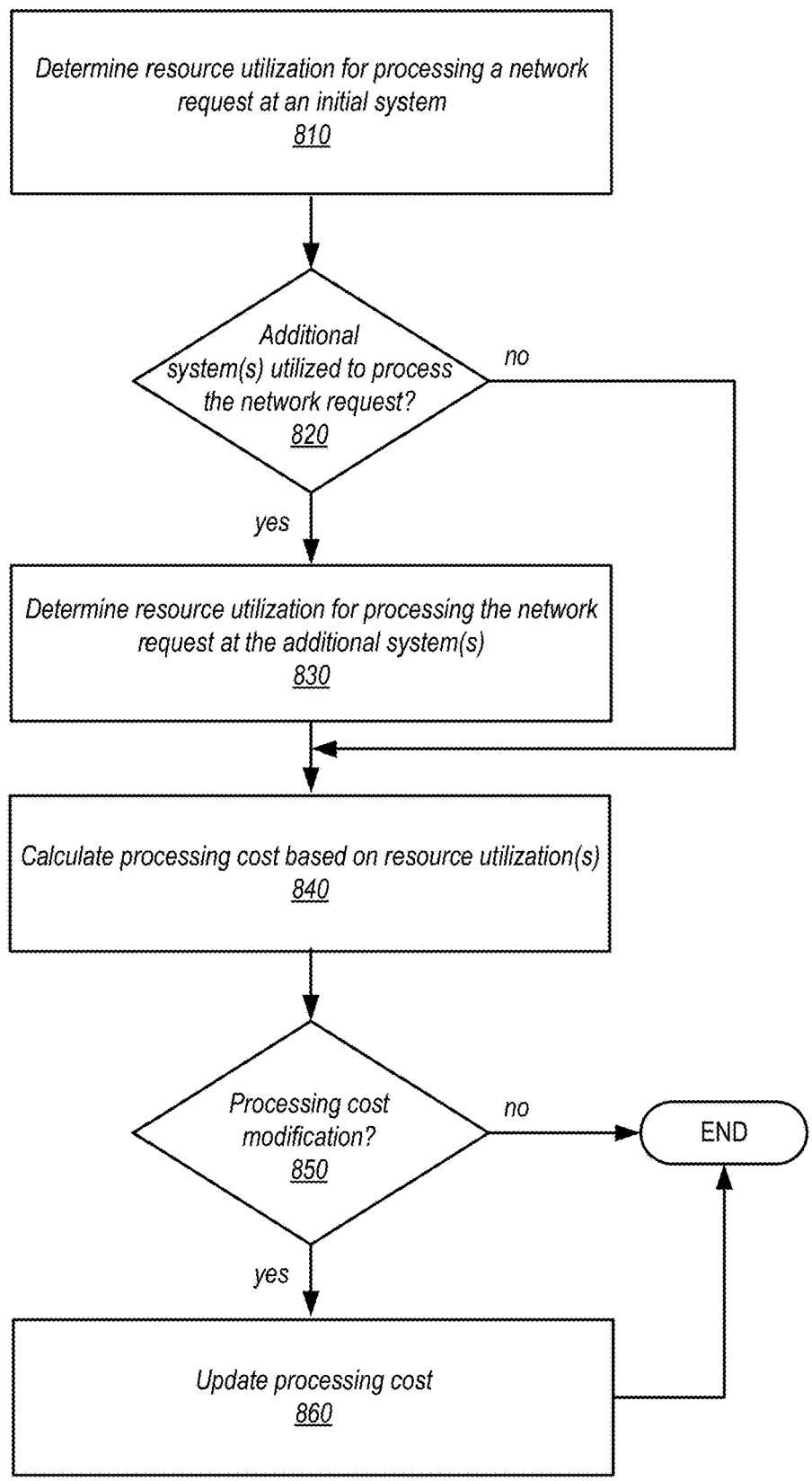
FIG. 8 is a high-level flowchart illustrating methods and techniques for determining a processing cost for a network request, according to some embodiments.

Different network requests may incur different costs or burdens on systems that service them, as noted above. Some requests may be serviced entirely at a system that receives them. For example, a database system may perform all of the processing of an access request directed to the database. Some network requests invoke jobs, workflows, techniques or other multi-part process that may involve work performed by separate or downstream systems from the system that initially receives the request. For example a request to a system to access a web page may involve a system to generate the web page and a storage system to provide image data. The cost to access the web page may be incurred at both the system that generates the page (and fields the access request) as well as the storage system which processes request(s) to provide the image data. Cost-based throttling may account for costs at multiple systems or distributed system locations for throttling requests, alleviating downstream effects caused by requests that impact multiple different systems. FIG. 8 is a high-level flowchart illustrating methods and techniques for determining a processing cost for a network request, according to some embodiments.

As indicated at 810, resource utilization for processing a network request at an initial system may be determined, in some embodiments. An initial system may be a system implementing a request handler that first begins the processing of a network request. In some embodiments, the initial system may not ultimately respond to the request, while in others the initial system may act as a front-end or client-facing system that interacts with other back-end systems or services. Determining resource utilization for processing the network request may involve tracking, collecting, or otherwise monitoring the resources consumed to process the network request at the initial system. For instance, CPU processing time may be totaled, IOPs or other storage access bandwidth may be determined, networking utilization, or any other performance metrics for processing the network request may be collected. If cost-based throttling is locally performed (local with respect to the initial system), then these metrics may be available to a cost-based throttling mechanism. However, as illustrated above in FIG. 4, cost-based throttling may be implemented at other locations than a request handler at a system, and thus the performance metrics may be reported or included in a response to a cost-based throttling mechanism located external to the initial system (e.g., to a load balancer).

If additional system(s) are utilized to process the network request, as indicated by the positive exit from 820, then resource utilization for processing the network request at the additional system(s) may be determined, in some embodiments, as indicated at 830. Similar to the resource utilization determination above, CPU processing time may be totaled, IOPs or other storage access bandwidth may be determined, networking utilization, or any other performance metrics for processing the network request may be collected for the additional system(s). The collected utilization information may be for different performance metrics, in some embodiments. For example, if additional systems provide certain kinds of storage then various storage related performance metrics (e.g., IOPs, disk utilization, etc.) may be collected, whereas processing intensive work performed at other systems, such as an initial system, may be collected according to processing metrics (e.g., CPU time). The performance metrics may be reported or included in a response to a cost-based throttling mechanism located at a request handler of the initial system, or other system external to the initial system (e.g., to a load balancer).

As indicated at 840, processing cost based on the resource utilization(s) may be calculated, in various embodiments. For example, time metrics may be aggregated to create a single processing time cost. In some embodiments, different resource utilizations, such as for different types of performance metric, may be translated, normalized, or otherwise converted into a common cost unit (e.g., time or percent utilization) according to the metric or form in which the request processing balance is measured (e.g., units per time). For example storage metrics may be converted into a generic resource utilization metric or may be converted into a CPU metric (e.g., estimating CPU performance required to achieve the measure storage metric). Weighting or other prioritization schemes may be implemented to create a composite processing cost from the different metrics (e.g., weight CPU utilization higher than network utilization).

In at least some embodiments, it may be desirable to modify a calculated processing cost. For example, some network request sources may have higher priority status for performing requests or higher numbers of allocated resources for performing the requests. Network requests associated with a particular user account, for instance, may have processing costs reduced in order to slow the reduction of request processing balance in a given time period. In some scenarios, certain detected events may trigger the modification of processing costs. Identifying a change from peak to off peak time for a system, for instance, may trigger the reduction in processing costs for network requests, effectively allowing more network request to be processed without throttling during off peak times. In some embodiments, a detected environmental condition, such as time of day or temperature, may trigger the modification of processing costs. Other events, such as detection of suspicious source (e.g., potentially malicious) of network requests may trigger an increase in the processing costs associated with network requests from the source. Processing costs may be modified as a result of purchasing, selecting, or utilizing different cost models. For example, as the demand for performing network requests goes up, some sources of network requests may be associated with cost models that allow for dynamic request processing allocation, allowing the amount of network requests processed in a given time period to change from time period to time period based on the demand. While other sources may be associated with a static cost model which provides consistent allocation for processing network requests. As indicated by the positive exit from 850, if processing cost modification is determined, then processing cost may be updated according to the identified modification (e.g., increased or decreased), as indicated at 860, in various embodiments. In some embodiments, a request processing balance may be modified instead of or in addition to modifying resource costs. For example, a budget for request processing may be increased during off peak times as compared to peak time.

The methods described herein may in various embodiments be implemented by any combination of hardware and software. For example, in one embodiment, the methods may be implemented by a computer system (e.g., a computer system as in FIG. 9) that includes one or more processors executing program instructions stored on a computer-readable storage medium coupled to the processors. The program instructions may be configured to implement the functionality described herein (e.g., the functionality of various servers and other components that implement the distributed systems described herein). The various methods as illustrated in the figures and described herein represent example embodiments of methods. The order of any method may be changed, and various elements may be added, reordered, combined, omitted, modified, etc.

Figure 9:
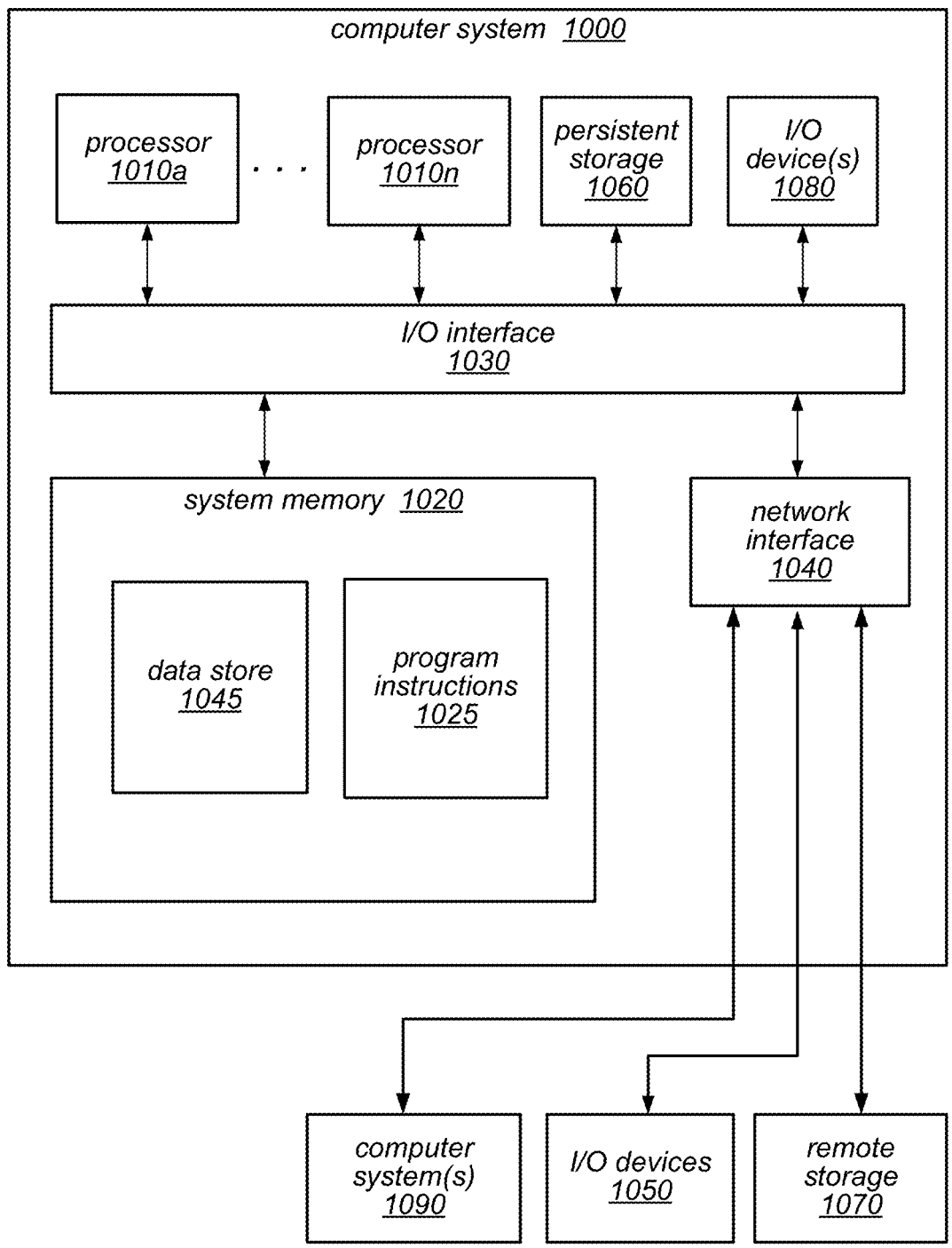
FIG. 9 is an example computer system, according to various embodiments.

FIG. 9 is a block diagram illustrating a computer system configured to implement at least a portion of the various nodes, systems, or components of the systems that implement cost-based throttling for network requests as described herein, according to various embodiments. For example, computer system 1000 may be configured to implement various request handlers of a distributed system that provides a network-based service on behalf of clients, in different embodiments, or more generally implement any of the various types of nodes or components that may be implemented as part of a network-based service. Computer system 1000 may be any of various types of devices, including, but not limited to, a personal computer system, desktop computer, laptop or notebook computer, mainframe computer system, handheld computer, workstation, network computer, a consumer device, application server, storage device, telephone, mobile telephone, or in general any type of computing device.

Computer system 1000 includes one or more processors 1010 (any of which may include multiple cores, which may be single or multi-threaded) coupled to a system memory 1020 via an input/output (I/O) interface 1030. Computer system 1000 further includes a network interface 1040 coupled to I/O interface 1030. In various embodiments, computer system 1000 may be a uniprocessor system including one processor 1010, or a multiprocessor system including several processors 1010 (e.g., two, four, eight, or another suitable number). Processors 1010 may be any suitable processors capable of executing instructions. For example, in various embodiments, processors 1010 may be general-purpose or embedded processors implementing any of a variety of instruction set architectures (ISAs), such as the x86, PowerPC, SPARC, or MIPS ISAs, or any other suitable ISA. In multiprocessor systems, each of processors 1010 may commonly, but not necessarily, implement the same ISA. The computer system 1000 also includes one or more network communication devices (e.g., network interface 1040) for communicating with other systems and/or components over a communications network (e.g. Internet, LAN, etc.). For example, a client application executing on system 1000 may use network interface 1040 to communicate with a server application executing on a single server or on a cluster of servers that implement one or more of the components of the database systems described herein. In another example, an instance of a server application executing on computer system 1000 may use network interface 1040 to communicate with other instances of the server application (or another server application) that may be implemented on other computer systems (e.g., computer systems 1090).

In the illustrated embodiment, computer system 1000 also includes one or more persistent storage devices 1060 and/or one or more I/O devices 1080. In various embodiments, persistent storage devices 1060 may correspond to disk drives, tape drives, solid state memory, other mass storage devices, or any other persistent storage device. Computer system 1000 (or a distributed application or operating system operating thereon) may store instructions and/or data in persistent storage devices 1060, as desired, and may retrieve the stored instruction and/or data as needed. For example, in some embodiments, computer system 1000 may host a storage system server node, and persistent storage 1060 may include the SSDs attached to that server node.

Computer system 1000 includes one or more system memories 1020 that are configured to store instructions and data accessible by processor(s) 1010. In various embodiments, system memories 1020 may be implemented using any suitable memory technology, (e.g., one or more of cache, static random access memory (SRAM), DRAM, RDRAM, EDO RAM, DDR 10 RAM, synchronous dynamic RAM (SDRAM), Rambus RAM, EEPROM, non-volatile/Flash-type memory, or any other type of memory). System memory 1020 may contain program instructions 1025 that are executable by processor(s) 1010 to implement the methods and techniques described herein. In various embodiments, program instructions 1025 may be encoded in platform native binary, any interpreted language such as Java™ byte-code, or in any other language such as C/C++, Java™, etc., or in any combination thereof. For example, in the illustrated embodiment, program instructions 1025 include program instructions executable to implement the functionality of a distributed system node or client of a distributed system. In some embodiments, program instructions 1025 may implement multiple separate clients, nodes, and/or other components.

In some embodiments, program instructions 1025 may include instructions executable to implement an operating system (not shown), which may be any of various operating systems, such as UNIX, LINUX, Solaris™, MacOS™, Windows™, etc. Any or all of program instructions 1025 may be provided as a computer program product, or software, that may include a non-transitory computer-readable storage medium having stored thereon instructions, which may be used to program a computer system (or other electronic devices) to perform a process according to various embodiments. A non-transitory computer-readable storage medium may include any mechanism for storing information in a form (e.g., software, processing application) readable by a machine (e.g., a computer). Generally speaking, a non-transitory computer-accessible medium may include computer-readable storage media or memory media such as magnetic or optical media, e.g., disk or DVD/CD-ROM coupled to computer system 1000 via I/O interface 1030. A non-transitory computer-readable storage medium may also include any volatile or non-volatile media such as RAM (e.g. SDRAM, DDR SDRAM, RDRAM, SRAM, etc.), ROM, etc., that may be included in some embodiments of computer system 1000 as system memory 1020 or another type of memory. In other embodiments, program instructions may be communicated using optical, acoustical or other form of propagated signal (e.g., carrier waves, infrared signals, digital signals, etc.) conveyed via a communication medium such as a network and/or a wireless link, such as may be implemented via network interface 1040.

In some embodiments, system memory 1020 may include data store 1045, which may be configured as described herein. For example, the information described herein as being stored by the storage system described herein may be stored in data store 1045 or in another portion of system memory 1020 on one or more nodes, in persistent storage 1060, and/or on one or more remote storage devices 1070, at different times and in various embodiments. Similarly, the information described herein as being stored by the storage system may be stored in another portion of system memory 1020 on one or more nodes, in persistent storage 1060, and/or on one or more remote storage devices 1070, at different times and in various embodiments. In general, system memory 1020 (e.g., data store 1045 within system memory 1020), persistent storage 1060, and/or remote storage 1070 may store data blocks, replicas of data blocks, metadata associated with data blocks and/or their state, database configuration information, and/or any other information usable in implementing the methods and techniques described herein.

In one embodiment, I/O interface 1030 may be configured to coordinate I/O traffic between processor 1010, system memory 1020 and any peripheral devices in the system, including through network interface 1040 or other peripheral interfaces. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. Also, in some embodiments, some or all of the functionality of I/O interface 1030, such as an interface to system memory 1020, may be incorporated directly into processor 1010.

Network interface 1040 may be configured to allow data to be exchanged between computer system 1000 and other devices attached to a network, such as other computer systems 1090 (which may implement one or more storage system server nodes, database engine head nodes, and/or clients of the database systems described herein), for example. In addition, network interface 1040 may be configured to allow communication between computer system 1000 and various I/O devices 1050 and/or remote storage 1070. Input/output devices 1050 may, in some embodiments, include one or more display terminals, keyboards, keypads, touchpads, scanning devices, voice or optical recognition devices, or any other devices suitable for entering or retrieving data by one or more computer systems 1000. Multiple input/output devices 1050 may be present in computer system 1000 or may be distributed on various nodes of a distributed system that includes computer system 1000. In some embodiments, similar input/output devices may be separate from computer system 1000 and may interact with one or more nodes of a distributed system that includes computer system 1000 through a wired or wireless connection, such as over network interface 1040. Network interface 1040 may commonly support one or more wireless networking protocols (e.g., Wi-Fi/IEEE 802.11, or another wireless networking standard). However, in various embodiments, network interface 1040 may support communication via any suitable wired or wireless general data networks, such as other types of Ethernet networks, for example. Additionally, network interface 1040 may support communication via telecommunications/telephony networks such as analog voice networks or digital fiber communications networks, via storage area networks such as Fibre Channel SANs, or via any other suitable type of network and/or protocol. In various embodiments, computer system 1000 may include more, fewer, or different components than those illustrated in FIG. 9 (e.g., displays, video cards, audio cards, peripheral devices, other network interfaces such as an ATM interface, an Ethernet interface, a Frame Relay interface, etc.)

It is noted that any of the distributed system embodiments described herein, or any of their components, may be implemented as one or more network-based services. For example, the distributed storage systems described herein may be offered to clients as a network-based service. In some embodiments, a network-based service may be implemented by a software and/or hardware system designed to support interoperable machine-to-machine interaction over a network. A network-based service may have an interface described in a machine-processable format, such as the Web Services Description Language (WSDL). Other systems may interact with the network-based service in a manner prescribed by the description of the network-based service's interface. For example, the network-based service may define various operations that other systems may invoke, and may define a particular application programming interface (API) to which other systems may be expected to conform when requesting the various operations.

In various embodiments, a network-based service may be requested or invoked through the use of a message that includes parameters and/or data associated with the network-based services request. Such a message may be formatted according to a particular markup language such as Extensible Markup Language (XML), and/or may be encapsulated using a protocol such as Simple Object Access Protocol (SOAP). To perform a network-based services request, a network-based services client may assemble a message including the request and convey the message to an addressable endpoint (e.g., a Uniform Resource Locator (URL)) corresponding to the network-based service, using an Internet-based application layer transfer protocol such as Hypertext Transfer Protocol (HTTP).

In some embodiments, network-based services may be implemented using Representational State Transfer ("RESTful") techniques rather than message-based techniques. For example, a network-based service implemented according to a RESTful technique may be invoked through parameters included within an HTTP method such as PUT, GET, or DELETE, rather than encapsulated within a SOAP message.

Although the embodiments above have been described in considerable detail, numerous variations and modifications may be made as would become apparent to those skilled in the art once the above disclosure is fully appreciated. It is intended that the following claims be interpreted to embrace all such modifications and changes and, accordingly, the above description to be regarded in an illustrative rather than a restrictive sense.

What is claimed is:

1. A system, comprising:
   at least one processor;
   a memory, storing program instructions, that when executed by the at least one processor cause the at least one processor to implement a request handler;
   the request handler, configured to:
      for a plurality of network requests received from a source within a given time period:
         direct processing of the plurality of network requests;
         based, at least in part, on the processing of the plurality of network requests, calculate respective processing costs for the plurality of network requests, wherein the respective processing cost of at least one of the plurality of network requests is different than the respective processing cost for another one of the plurality of network requests;
         detect an occurrence of a modification event;
         in response to detection of the modification event, modify at least one of the respective processing costs based at least in part on identification of an event type of the modification event;
         update a request processing balance for processing network requests in the given time period based, at least in part, on subtracting the respective processing costs, including the at least one of the respective processing costs as modified, for the plurality of network requests from the request processing balance to determine a current request processing balance;
      receive another network request subsequent to the plurality of network requests from the source within the given time period; and
      in response to receiving the other network request, deny the other network request based, at least in part, on a determination that the current request processing balance is one or more of zero, negative or allocated to the plurality of network requests.

2. The system of claim 1, wherein to calculate the respective processing costs for the plurality of network requests, the request handler is configured to determine respective elapsed times to service the plurality of network requests.

3. The system of claim 1, wherein to deny the other network request, the request handler is configured to:
   determine an estimated processing cost for the other network request; and
   compare the estimated processing cost with the current processing cost balance to determine that the estimated processing cost exceeds the current processing cost balance.

4. The system of claim 1, wherein the request handler is a request handler for a network-based service, and wherein the source is a client of the network-based service.

5. A method, comprising:
   performing, by one or more computing devices:
      for a plurality of network requests received from a source within a given time period:
         determining respective processing costs for the plurality of network requests based at least in part on processing the plurality of network requests;
         detecting an occurrence of a modification event;
         in response to detecting the modification event, modifying at least one of the respective processing costs based at least in part on identifying an event type of the modification event;
         updating a request processing balance for processing network requests in the given time period based, at least in part, on subtracting the respective processing costs, including the at least one of the respective processing costs as modified, for the plurality of network requests from the request processing balance to determine a current request processing balance;
      receiving another network request subsequent to the plurality of network requests from the source within the given time period; and
      in response to receiving the other network request, throttling the other network request based, at least in part, on the current request processing balance.

6. The method of claim 5, further comprising:
   processing the plurality of network requests; and
   wherein determining respective processing costs for the plurality of network requests is based, at least in part, on the processing of the plurality of network requests.

7. The method of claim 6, wherein determining the respective processing costs for the plurality of network requests comprises obtaining a respective one or more resource consumption metrics for the processing the plurality of network requests.

8. The method of claim 7, wherein the plurality of network requests and the other network request are requests directed to a network-based system, and wherein at least one of the respective one or more resource consumption metrics indicates resource consumption at a different network-based system than the network-based system.

9. The method of claim 5, wherein determining the respective processing costs for the plurality of network requests comprises:
   determining a respective network request type of a plurality of network request types for the plurality of network requests; and
   identifying a predetermined cost corresponding to the respective network request type of the plurality of network requests.

10. The method of claim 5, wherein the modification event comprises a change from peak time to off-peak time.

11. The method of claim 5, wherein the modification event is an environmental condition.

12. The method of claim 5, wherein the source comprises one or more clients associated with a user account.

13. The method of claim 5, wherein throttling the other network request based, at least in part, on the current request processing balance comprises:
   determining an estimated processing cost for the other network request; and comparing the estimated processing cost with the current processing cost balance to determine that the estimated processing cost exceeds the current processing cost balance.

14. The method of claim 5, further comprising providing the current processing cost balance to one or more request handlers that receive network requests from the source to perform throttling for subsequent requests received at the one or more request handlers from the source.

15. A non-transitory, computer-readable storage medium, storing program instructions that when executed by one or more computing devices cause the one or more computing devices to implement:

for a plurality of network requests received from a source within a given time period:
 determining respective processing costs for the plurality of network requests, wherein the respective processing cost of at least one of the plurality of network requests is different than the respective processing cost for another one of the plurality of network requests;
 detecting an occurrence of a modification event;
 in response to detecting the modification event, modifying at least one of the respective processing costs based at least in part on identifying an event type of the modification event;
 updating a request processing balance for processing network requests in the given time period based, at least in part, on subtracting the respective processing costs, including the at least one of the respective processing costs as modified, for the plurality of network requests from the request processing balance to determine a current request processing balance;

receiving another network request subsequent to the plurality of network requests from the source within the given time period; and
 in response to receiving the other network request, denying the other network request based, at least in part, on the current request processing balance.

16. The non-transitory, computer-readable storage medium of claim 15, wherein the program instructions cause the one or more computing devices to further implement:
 processing the plurality of network requests;
 wherein determining respective processing costs for the plurality of network requests is based, at least in part, on the processing of the plurality of network requests.

17. The non-transitory, computer-readable storage medium of claim 16, wherein, in determining the respective processing costs for the plurality of network requests, the program instructions cause the one or more computing devices to implement obtaining a respective one or more resource consumption metrics for the processing the plurality of network requests.

18. The non-transitory, computer-readable storage medium of claim 15, wherein the source comprises one or more network addresses.

19. The non-transitory, computer-readable storage medium of claim 15, wherein the program instructions cause the one or more computing devices to implement providing the current processing cost balance via an interface.

20. The non-transitory, computer-readable storage medium of claim 15, wherein the one or more computing devices are implemented as part of a load balancer.

21. The non-transitory, computer-readable storage medium of claim 15, wherein the plurality of network requests are directed to a network-based service, and wherein the source is at least one client of the network-based service.

* * * * *